United States Patent [19]

Milne

[11] Patent Number: 4,535,196
[45] Date of Patent: Aug. 13, 1985

[54] ELECTRICAL ANTI-SHORT BUSHING

[76] Inventor: John D. Milne, 77 Bywood Dr., Islington, Ontario, Canada, M9A 1M2

[21] Appl. No.: 439,109

[22] Filed: Nov. 4, 1982

[51] Int. Cl.³ ............................................. H02G 15/06
[52] U.S. Cl. ............................................. 174/83; 16/2
[58] Field of Search .................... 174/83, 153 G, 156; 16/2

[56] References Cited

U.S. PATENT DOCUMENTS

| Re. 20,873 | 10/1938 | Fullman | 174/83 |
|---|---|---|---|
| 1,801,549 | 4/1931 | Frederickson | 174/83 |
| 1,829,512 | 10/1931 | Frederickson | 174/83 |
| 2,209,274 | 7/1940 | Jaberg | 174/83 |
| 3,562,847 | 2/1971 | Jemison | 174/153 G X |
| 3,627,904 | 12/1971 | Milne | 174/83 |
| 3,643,290 | 2/1972 | Milne | 16/2 |
| 3,684,220 | 8/1972 | Logsdon | 16/2 X |
| 3,749,818 | 7/1973 | Jemison | 174/153 G |
| 3,836,698 | 9/1974 | Bawa | 16/2 X |

Primary Examiner—A. T. Grimlay
Assistant Examiner—Morris H. Nimmo
Attorney, Agent, or Firm—Ridout & Maybee

[57] ABSTRACT

In an electrical anti-short bushing comprising a tubular portion and an outwardly extending flange portion presented by one end of the tubular portion, the bushing which is of split form having a discontinuity extending throughout its axial length is provided with two outwardly projecting, circumferentially spaced ribs which extend axially from the flange portion along at least a portion of the tubular portion of the bushing, with the part of the tubular portion between the ribs being diametrically opposite the axially extending discontinuity. Thus, when the bushing is operatively mounted on an electrical cable of the type known as BX cable with the tubular portion of the bushing between the outer casing of the cable and the insulated conductor wires disposed therethrough the sharp, jagged edge formed when the helically wound metal cladding strip constituting the outer casing of the cable is cut may be disposed between the ribs, thereby substantially to prevent this sharp, jagged cut coming into alignment with the axial discontinuity in the bushing. An inspection notch may be provided in the outer edge of the flange portion of the bushing between the ribs, and a resiliently deformable prong which is presented by the inner face of the tubular portion of the bushing and projects, in a direction inclined towards the longitudinal axis thereof, towards and beyond the flange portion of the bushing operatively serves to prevent inadvertent withdrawal of the bushing once it is installed.

11 Claims, 6 Drawing Figures

ELECTRICAL ANTI-SHORT BUSHING

This invention relates to electrical anti-short bushings which are operatively mounted on electrical cables where, for example, the cables enter and are secured by connectors to electrical outlet boxes or the like for connection of the electrical conductor wires of the cables to electrical terminals within the outlet boxes, the bushings each operatively serving substantially to prevent the end of the outer casing of the associated cable from which the insulated conductor wires project from cutting through or otherwise abrading the insulation on the conductor wires with a resultant risk of electrical shorting. This risk of the end of the outer casing of the cable cutting through or otherwise abrading the insulation on the conductor wires is particularly great where, for example, the cable is of the type known as BX cable in which the outer casing of the cable is constituted by a helically wound strip of metallic cladding the adjacent coils of which are interlocked, since when the metallic strip is cut and the end portion thereof removed in order to provide the end of the outer casing of the cable from which the insulated conductor wires protrude this end of the outer casing at the location of the cut in the metallic strip is frequently of sharp, jagged form which is particularly likely to cut through the insulation on the conductor wires.

In order to facilitate the operative mounting of a bushing of the type hereinbefore described the bushing may be in the form of a split bushing having a discontinuity extending throughout its axial length, since such a bushing does not require to be threaded onto the electrical cable from the ends of the conductor wires but may simply be snapped over the conductor wires. However, with such a split bushing it is, of course, important that the sharp, jagged part of the end of the outer casing of the cable is maintained out of alignment with the axially extending discontinuity in the bushing since at this discontinuity the bushing does not serve to protect the insulation on the conductor wires from the sharp, jagged part of the end of the outer casing of the cable, and it is a primary object of the present invention to provide an electrical anti-short bushing which is of the type hereinbefore described and has a discontinuity extending throughout its axial length and in which the bushing is particularly adapted when in use to avoid the axially extending discontinuity being in alignment with the sharp, jagged part of the end of the outer casing of the cable.

In accordance with one aspect of the present invention there is provided an electrical anti-short bushing mounted on an electrical cable which has a longitudinal axis and which comprises an outer casing in the form of a helically wound metallic cladding strip adjacent coils of which are interlocked, and electrically insulated conductor wiring extending through and projecting from an end of the outer casing, said end of the outer casing comprising a substantially axial cut through the metallic cladding strip with the cut extending substantially parallel to the longitudinal axis of the cable. The bushing comprises a tubular portion having a longitudinal axis and having a first end and a second end, and an outwardly extending flange portion presented by said first end of the tubular portion. The tubular portion is disposed between the outer casing of the electrical cable and the insulated conductor wiring which extends therethrough. The bushing has a discontinuity extending throughout its axial length, and two outwardly projecting, circumferentially spaced ribs extend axially along at least a portion of the tubular portion of the bushing with a part of the tubular portion being between the ribs and with said cut through the metallic cladding strip of the outer casing being positioned between the ribs. One of the ribs is resiliently deformably wedged under the end portion of the metallic cladding strip which presents said cut, and the other of the ribs has an undeformed portion which faces said cut through the metallic cladding strip. Thus, inadvertent turning in the appropriate direction of the bushing relative to the cable to dispose the discontinuity of the bushing in alignment with said cut through the metallic cladding strip is substantially prevented by interengagement of said other of the ribs of the bushing with said cut through the metallic cladding strip.

In accordance with a further aspect of the invention there is provided an electrical anti-short bushing mounted on an electrical cable which has a longitudinal axis and which comprises an outer casing in the form of a helically wound metallic cladding strip adjacent coils of which are interlocked, and electrically insulated conductor wiring extending through and projecting from an end of the outer casing, said end of the outer casing comprising a cut through the metallic cladding strip with the cut extending substantially parallel to the longitudinal axis of the cable and having an inwardly projecting portion of sharp form. The bushing comprises a tubular portion having a longitudinal axis and having a first end and a second end, and an outwardly extending flange portion presented by said first end of the tubular portion. The tubular portion is disposed between the outer casing of the electrical cable and the insulated conductor wiring which extends therethrough. The bushing has a discontinuity extending throughout its axial length and two outwardly projecting, circumferentially spaced ribs extending axially along at least a portion of the tubular portion of the bushing with a part of the tubular portion being between the ribs and with said cut through the metallic cladding strip of the outer casing being positioned between the ribs. Thus, inadvertent turning of the bushing in either direction relative to the cable to dispose the discontinuity of the bushing in alignment with said inwardly projecting sharp portion of said cut through the metallic cladding strip is substantially prevented by interengagement of a respective one of the outwardly projecting ribs of the bushing with said inwardly projecting portion of said cut through the metallic cladding strip.

In order that the present invention may be more clearly understood and more readily carried into effect the same will now, by way of example, be more fully described with reference to the accompanying drawings in which FIG. 1 is a view of an electrical anti-short bushing according to a preferred embodiment of the invention;

Figure 5:
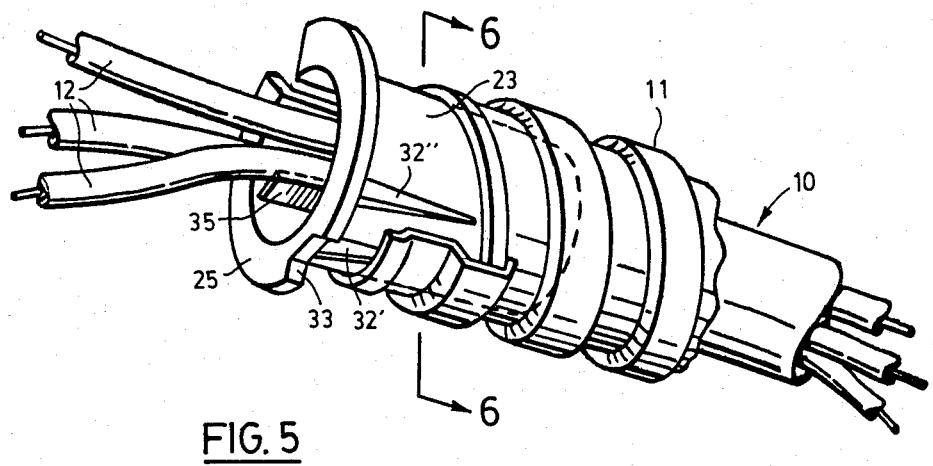
FIG. 5 is a view on a considerably enlarged scale of the installation shown in FIG. 3, but with various elements of the installation of FIG. 3 omitted for clarity.

Referring to the drawings and particularly to FIG. 5 thereof, 10 denotes generally an electrical cable of the type known as BX cable having an outer casing 11 in the form of a helically wound metallic cladding strip the adjacent coils of which are interlocked. The cable 10 also comprises wiring constituted preferably by a plurality of two or more conductor wires 12 which are electrically insulated by being provided with coatings of suitable plastics material or the like, these conductor wires 12 extending through and projecting from the outer casing 11.

Figure 3:
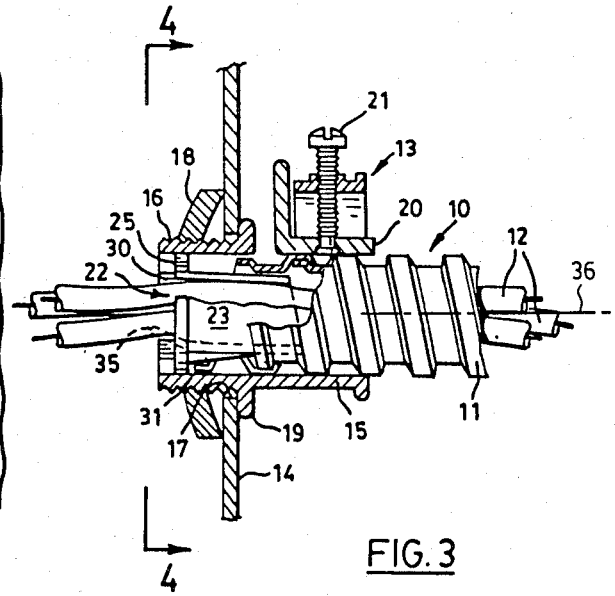
FIG. 3 is a partially broken-away view of the bushing of FIGS. 1 and 2, the bushing being shown operatively installed with parts of the installation in which the bushing is incorporated sectioned.

As shown in FIG. 3, in which for simplicity the outer casing 11 of the cable 10 is shown in somewhat diagrammatic form, the cable 10 is coupled by means of a connector which may be of conventional form and which is denoted generally by the reference numeral 13 to an electrical outlet box or the like, a portion of one of the walls of the electrical outlet box being shown in FIG. 3 and being identified by the reference numeral 14. As shown in FIG. 3 the connector 13 comprises a body 15 having an externally screw-threaded hollow tubular portion 16 which operatively projects through an opening 17 in the wall 14 of the electrical outlet box, a lock nut 18 (omitted for clarity in FIG. 5), being screw-threadedly mounted on the portion 16 of the body 15 thereby to clamp the wall 14 between the lock nut 18 and a flange portion 19 of the body 15 and thus securely mount the connector 13 to the electrical outlet box.

The connector 13 also comprises a L-shaped clamping member 20 which, under the influence of a lock screw 21 screw-threadedly mounted in the body 15, securely clamps to the connector 13 the outer casing 11 of the cable 10 which extends through the connector 13.

Figure 1:
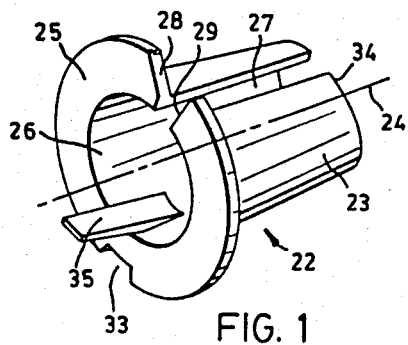
Figure 2:
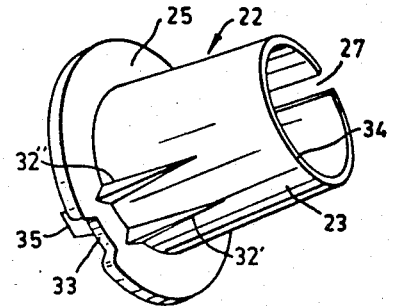
FIG. 2 is a view of the bushing shown in FIG. 1, as seen from the opposite direction.
Figure 4:
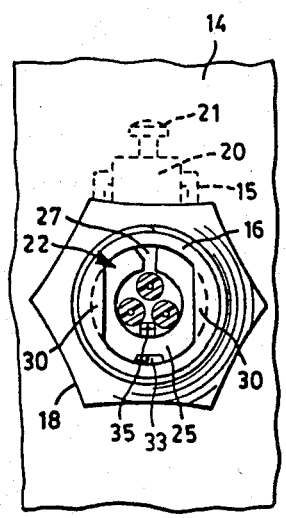
FIG. 4 is a sectioned view on the line 4—4 in FIG. 3.

Mounted on the cable 10 is an electrical anti-short bushing 22 which comprises a tubular portion 23 having a longitudinal axis 24 (shown in FIG. 1), and an outwardly extending flange portion 25 which is presented at a first end 26 of the tubular portion 23. The bushing 22 is in the form of a split bushing having a discontinuity 27 which extends throughout the axial length of the bushing 22, at least one edge 28 of the flange portion 25 bounding the discontinuity 27 being of chamfered form, as clearly shown in FIG. 1, in order to facilitate snapping of the bushing 22 onto the insulated conductor wires 12 (FIG. 3) when the bushing 22 is being installed. It will of course be appreciated that, if desired, the outer edge 29 of the flange portion 25 bounding the discontinuity 27 may also be of chamfered form corresponding to the edge 28.

With the bushing 22 in its installed condition the tubular portion 23 is disposed between the outer casing 11 of the cable 10 and the insulated conductor wires 12, and the flange portion 25 is disposed between the end of the outer casing 11 from which the insulated conductor wires 12 project and two inwardly projecting, diametrically opposed stop members 30 presented by the portion 16 of the body 15, so that the bushing 22 thus serves substantially to prevent the insulation on the conductor wires 12 from being cut by the end of the outer casing 11 with resultant risk of electrical shorting.

Figure 6:
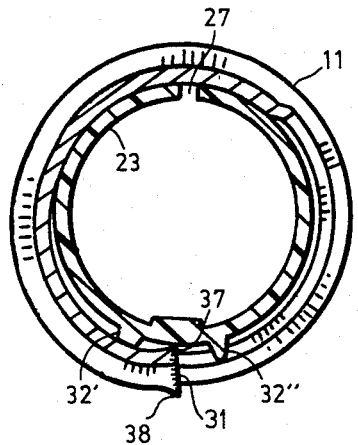
FIG. 6 is a sectioned view generally on the line 6—6 in FIG. 5.

In cutting-back the outer casing 11 of the cable 10 to form the end thereof from which the insulated conductor wires 12 project a cut 31 is made through the metallic cladding strip constituting the outer casing 11, this cut 31 extending substantially parallel to the longitudinal axis 36 (shown in FIG. 3) of the cable 10. Irrespective of whether this cut 31 is made by the use of a hack saw, cutting pliers or other cutting machines or tool this cut 31 is of sharp, and frequently also jagged, form in that as is standard when sheet metal or the like is cut an inwardly projecting sharp and frequently jagged portion or burr 37 and a corresponding outwardly projecting sharp and frequently jagged portion or burr 38 are presented. These portions or burrs 37, 38 which are shown in exagerrated manner in FIG. 6, which is a sectioned view in the helically disposed "trough" of the outer casing 11 at approximately the 2 o'clock position as viewed in FIG. 6, would be especially liable to cut through or abrade the insulation on the conductor wires 12. Substantially to avoid such an occurrence the bushing 22 is provided with two outwardly projecting, circumferentially spaced ribs 32', 32" which extend axially along at least a portion of the tubular portion 23 of the bushing 22 preferably from the flange portion 25, the part of the tubular portion 23 between these ribs 32', 32" being preferably diametrically opposite the axially extending discontinuity 27 and the bushing 22 being operatively installed with the cut 31 between the ribs 32', 32".

The rib 32' is resiliently deformably wedged under the end portion of the metallic cladding strip which presents the cut 31, and the rib 32" has an undeformed portion which faces the cut 31. Thus, inadvertent turning in the appropriate direction i.e. clockwise as viewed in FIG. 6, of the bushing 22 relative to the cable 10 to dispose the discontinuity 27 of the bushing 22 in alignment with the cut 31 and which could of course result in the insulation on the conductor wires 12 being cut or abraded by the cut 31 and in particular by the inwardly projecting burr 37 is substantially prevented by interengagement of the rib 32" with the cut 31. Furthermore, inadvertent turning of the bushing 22, in either direction, relative to the cable 10 to dispose the discontinuity 27 of the bushing 22 in alignment with the cut 31 is substantially prevented by interengagement of one or other of the ribs 32', 32" with the inwardly projecting butt 37. As shown in the drawings the ribs 32', 32" are preferably tapered in the direction from the flange portion 25 of the bushing 22, 32' under the above-mentioned end portion of the metallic cladding strip which presents the cut 31 by, for example, a slight twisting of the bushing 22 relative to the cable 10. Furthermore, it is to be understood that there may be additional ribs corresponding to the ribs 32', 32" presented by the bushing 22 in order more securely to mount the bushing 22 relative to the cable 10.

In the preferred embodiment of the invention a notch 33 is provided in the outer edge of the flange portion 25 and between the ribs 32', 32", this notch 33 permitting, for example, an electrical inspector to confirm not only that the bushing 22 has been installed but also that it has been correctly installed with the cut 31 between the ribs 32', 32", after the assembly hereinbefore decribed with reference to FIG. 3 has been completed. The notch 33 also serves to facilitate contraction of the bushing 22 as the bushing 22 is operatively mounted with the tubular portion 23 thereof between the outer casing 11 and the insulated conductor wires 12 of the cable 10. To facilitate this mounting of the bushing 22 the tubular portion 23 is preferably slightly tapered in the direction from the flange portion 25, and the second end 34 of the tubular portion 23 is preferably spade-shaped for ease of entry of this second end 34 of the tubular portion 23 between the outer casing 11 and the insulated conductor wires 12.

The bushing 22 preferably further comprises a resilient deformable prong 35 which projects, in a direction inclined towards the longitudinal axis 24, from the inner face of the tubular portion 23 towards and preferably beyond the flange portion 25. It will be appreciated that as the bushing 22 is operatively mounted with the tubular portion 23 being urged between the outer casing 11 and the insulated conductor wires 12 the prong 35 bears against and is resiliently deformed by the insulated conductor wires 12, the free end edge of the prong 35 operatively bearing against the insulation on one or more of the conductor wires 12 when the bushing 22 is fully installed thereby substantially to prevent inadvertent withdrawal of the bushing 22. Furthermore, since the free end portion of the prong 35 may, with the bushing 22 in its installed condition, be disposed between the insulated conductor wires 12 this further serves to prevent any unintentional turning of the bushing 22 relative to the cable 10. While as described above, with reference to the accompanying drawings, the bushing 22 incorporates only one prong 35 it will be appreciated that in alternative embodiments (not shown) there may be a plurality of such prongs 35 which are circumferentially spaced apart.

The bushing 22 is preferably integrally formed of a suitable plastics material such as, for example, polyethylene.

I claim:

1. An electrical anti-short bushing mounted on an electrical cable which has a longitudinal axis and which comprises an outer casing in the form of a helically wound metallic cladding strip adjacent coils of which are interlocked, and electrically insulated conductor wiring extending through and projecting from an end of the outer casing, said end of the outer casing comprises a cut through the metallic cladding strip with the cut extending substantially parallel to the longitudinal axis of the cable, the bushing comprising a tubular portion having a longitudinal axis and having a first end and a second end, and an outwardly extending flange portion presented by said first end of the tubular portion, the tubular portion being disposed between the outer casing of the electrical cable and the insulated conductor wiring which extends therethrough, the bushing having a discontinuity extending throughout its axial length, and two outwardly projecting, circumferentially spaced ribs extending axially along at least a portion of the tubular portion of the bushing with a part of the tubular portion being between the ribs and with said cut through the metallic cladding strip of the outer casing being positioned between the ribs, one of the ribs being resiliently deformably wedged under the end portion of the metallic cladding strip which presents said cut, and the other of the ribs having an undeformed portion which faces said cut through the metallic cladding strip whereby inadvertent turning in the appropriate direction of the bushing relative to the cable to dispose the discontinuity of the bushing in alignment with said cut through the metallic cladding strip is substantially prevented by interengagement of said other of the ribs of the bushing with said cut through the metallic cladding strip.

2. A bushing according to either one of claim 1, wherein the ribs extend from the flange portion of the bushing.

3. A bushing according to claim 1, wherein the ribs are tapered in the direction from the flange portion of the bushing.

4. A bushing according to claim 1, wherein the flange portion has an outer edge, and an inspection notch is provided in said outer edge of the flange portion and between the ribs.

5. A bushing according to claim 1, wherein the tubular portion is slightly tapered in the direction from the flange portion of the bushing.

6. A bushing according to claim 1, wherein the second end of the tubular portion of the bushing is spade-shaped.

7. A bushing according to claim 1, wherein the flange portion of the bushing has edges bounding the discontinuity therein, and at least one of said edges of the flange portion of the bushing bounding the discontinuity therein is of chamfered form.

8. A bushing according to claim 1, wherein the part of the tubular portion between the ribs is substantially diametrically opposite the discontinuity in the bushing.

9. A bushing according to claim 1, wherein the tubular portion of the bushing has an inner face, and a resiliently deformable prong projects, in a direction inclined towards the longitudinal axis of the bushing, from the inner face of the tubular portion towards the flange portion of the bushing, the conductor wiring of the electrical cable comprising a plurality of electrically insulated conductor wires, and the prong having a free end portion which is disposed between said conductor wires further to prevent inadvertent turning of the bushing relative to the cable.

10. A bushing according to claim 9 wherein the prong extends from the tubular portion of the bushing beyond the flange portion thereof.

11. An electrical anti-short bushing mounted on an electrical cable which has a longitudinal axis and which comprises an outer casing in the form of a helically wound metallic cladding strip adjacent coils of which are interlocked, and electrically insulated conductor wiring extending through and projecting from an end of the outer casing, said end of the outer casing comprising a cut through the metallic cladding strip with the cut extending substantially parallel to the longitudinal axis of the cable and having an inwardly projecting portion of sharp form, the bushing comprising a tubular portion having a longitudinal axis and having a first end and a second end, and an outwardly extending flange portion presented by said first end of the tubular portion, the tubular portion being disposed between the outer casing of the electrical cable and the insulated conductor wiring which extends therethrough, the bushing having a discontinuity extending throughout its axial length, and two outwardly projecting, circumferentially spaced ribs extending axially along at least a portion of the tubular portion of the bushing with a part of the tubular portion being between the ribs and with said cut through the metallic cladding strip of the outer casing being positioned between the ribs whereby inadvertent turning of the bushing in either direction relative to the cable to dispose the discontinuity of the bushing in alignment with said inwardly projecting sharp portion of said cut through the metallic cladding strip is substantially prevented by interengagement of a respective one of the outwardly projecting ribs of the bushing with said inwardly projecting portion of said cut through the metallic cladding strip.

* * * * *